United States Patent [19]

Lassiaz

[11] Patent Number: 4,643,286
[45] Date of Patent: Feb. 17, 1987

[54] CLUTCH RELEASE BEARING
[75] Inventor: Philippe Lassiaz, Boulogne, France
[73] Assignee: Valeo, Paris, France
[21] Appl. No.: 702,727
[22] Filed: Feb. 19, 1985
[30] Foreign Application Priority Data

Feb. 21, 1984 [FR] France ................................ 84 02584

[51] Int. Cl.4 ...................... F16D 23/14; B21D 39/03; B21D 53/10; F16C 19/02
[52] U.S. Cl. .................................. 192/98; 192/110 B; 29/148.4 B; 29/428; 384/490
[58] Field of Search ................. 192/98, 110 B, 110 R; 384/490; 29/148.4 B, 428

[56] References Cited

U.S. PATENT DOCUMENTS

| 3,882,979 | 5/1975 | Limbacher et al. | 192/110 B X |
| 3,963,106 | 6/1976 | Ernst et al. | 192/110 B X |
| 4,144,957 | 3/1979 | de Gennes | 192/98 |
| 4,371,086 | 2/1983 | Billet | 192/110 B X |

FOREIGN PATENT DOCUMENTS

| 2304828 | 10/1976 | France . |
| 2337281 | 7/1977 | France . |
| 2465120 | 3/1981 | France . |
| 2504625 | 10/1982 | France . |
| 2544429 | 10/1984 | France . |

*Primary Examiner*—Stuart S. Levy
*Assistant Examiner*—Lynn M. Sohacki
*Attorney, Agent, or Firm*—Charles E. Brown; Charles A. Brown

[57] ABSTRACT

A maintained self-centering clutch release bearing comprises an operating sleeve moved axially by clutch release control means. There is radial clearance between the sleeve and a bearing comprising a non-turning race, a turning race and rolling members between the races. A clutch cover assembly operating boss is fastened to the turning race. There are respective and adjacently disposed rims on the non-turning race and the operating sleeve, both perpendicular to the axial direction. An elastic clamping ring bears against bearing means on the operating sleeve and acts axially on the rim of the non-turning race to urge its rim axially towards the rim of the operating sleeve, so that the rims are clamped axially together, with friction. This assembles together the bearing and the operating sleeve and provides for maintained self-cerntering of the clutch release bearing relative to the clutch cover assembly. The bearing means on the operating sleeve comprise annular radially projecting means locally interrupted by at least one passage means featuring an engagement ramp surface. The elastic clamping means comprise radial lugs adapted to pass through the passage means and bearing on the engagement ramp surface. In this way rotation of the elastic clamping ring axially compresses it and forces the radial lugs against the ramp surface, so that the lugs bear against the annular radially projecting means.

21 Claims, 14 Drawing Figures

CLUTCH RELEASE BEARING

BACKGROUND OF THE INVENTION

1. Field of the Invention

The present invention relates to a clutch release bearing designed to release a clutch cover assembly, inter alia for automobile vehicles, this release bearing comprising an operating sleeve adapted to be moved axially by associated clutch release control means, a bearing comprising a non-turning race, a turning race and rolling members between the non-turning and turning races, there being radial clearance between the non-turning race of the bearing and the sleeve, a clutch cover assembly operating boss carried by and fastened to the turning race of said bearing, respective and adjacently disposed rims on the non-turning race and the operating sleeve perpendicular to the axial direction, bearing means on the operating sleeve, and on elastic clamping ring bearing against the bearing means and acting axially on the rim of the non-turning race of the bearing so as to urge said rim of the non-turning race axially towards the rim of the operating sleeve, so as to clamp the two rims axially together, with friction, in order to assemble together the bearing and the operating sleeve and to provide for sustained self-centering of the clutch release bearing relative to the clutch cover assembly.

2. Description of the Prior Art

A clutch release bearing of this kind is self-centering since the clutch cover assembly operating boss is free to move within limits of transverse radial clearance in all directions relative to the operating sleeve. Because of this, even if the axes of the clutch release bearing and clutch cover assembly are not exactly aligned at the time of assembly, once a few clutch engagement and release operations have been completed, the operating boss fastened to the turning race of the bearing of itself assumes a position which is centered relative to the axis of the clutch cover assembly, whereas the operating sleeve remains in its original position. Also, by virtue of the elastic clamping ring a self-centering clutch release bearing of this kind benefits from sustained self-centering action. Because it is loaded by the elastic clamping ring, the operating boss fastened to the turning race of the bearing retains between two clutch release operations the position relative to the operating sleeve it assumed of itself at the onset of the operation, this being the correct one.

In addition to this role of maintaining the self-centering action, the elastic clamping ring serves to assemble together the bearing and the operating sleeve so as to constitute the clutch release bearing assembly. Thus it also has an assembly function.

The arrangements proposed until now to obtain an assembly of this kind are not entirely satisfactory, either because they involve complex structures or because the assembly process itself requires special precautions.

An object of the present invention is a clutch release bearing of the type indicated hereinabove which constitutes a better match than previously available to the various practical desiderata and which, with a simple, rugged and economic structure, provides for easy assembly of the bearing to the operating sleeve, through the intermediary of the elastic clamping ring.

SUMMARY OF THE INVENTION

The invention consists in a clutch release bearing comprising an operating sleeve adapted to be moved axially by associated clutch release control means, a bearing comprising a non-turning race, a turning race and rolling members between said non-turning and turning races, there being radial clearance between said non-turning race and said sleeve, a clutch cover assembly operating boss carried by and fastened to said turning race of said bearing, respective and adjacently disposed rims on said non-turning race and said operating sleeve perpendicular to the axial direction, bearing means on said operating sleeve, and an elastic clamping ring bearing against said bearing means and acting axially on said rim of said non-turning race of said bearing so as to urge said rim of said non-turning race axially towards said rim of said operating sleeve so as to clamp said rims axially together, with friction, in order to assemble together said bearing and said operating sleeve and to provide for sustained self-centering of said clutch release bearing relative to said clutch cover assembly, wherein said bearing means on said operating sleeve comprise annular radial projecting means locally interrupted by at least one passage means featuring an engagement ramp surface, and said elastic clamping means comprise radial lugs adapted to pass through said at least one passage means, bearing on said engagement ramp surface, whereby rotation of said elastic clamping ring axially compresses same and forces said radial lugs against said ramp surface, so that said lugs bear against said annular radial projecting means.

By virtue of this arrangement, the various component parts of the assembly are extremely simple. Assembly is particularly convenient since it is sufficient to offer up the bearing to the operating sleeve by bringing together the rim on the turning race of the bearing and the rim on the operating sleeve and then to turn the elastic clamping ring, bringing about axial compression of the latter, to make it pass through the passage means into abutting engagement against the radial projecting means.

In one embodiment, the radial projecting means comprise an annular rib and the passage means comprise at least one passage through which the radial lugs of the elastic clamping ring are adapted to be passed in succession.

As an alternative, the radial projecting means may comprise an annular row of spaced studs and said passage means may then comprise a plurality of passages formed between said studs through which the radial lugs of the elastic clamping ring are adapted to be passed simultaneously.

The elastic clamping ring may be of any appropriate shape. It may be a Belleville spring or a corrugated washer, for example.

The elastic clamping ring may be rotated to engage it against the annular radial projecting means by any appropriate means. For example, the elastic clamping ring may be circumferentially fastened to the non-turning race of the bearing and it is operating on this non-turning race, by imposing on it a circumferential displacement which necessarily entrains the elastic clamping ring, which effects the assembly.

Alternatively, openings may be provided in the rims on the operating sleeve and the non-turning race of the bearing to provide for inserting a tool by means of which the elastic clamping ring may be rotated for the purposes of assembly.

In accordance with a further characteristic of the invention, the radial lugs on the elastic clamping ring may be engaged in an interlocking manner against the annular projecting means.

Other objects and advantages will appear from the following description of examples of the invention, when considered in connection with the accompanying drawings, and the novel features will be particularly pointed out in the appended claims.

DESCRIPTION OF THE PREFERRED EMBODIMENTS

Reference will first be made to FIGS. 1 through 5 which concern, by way of non-limiting example, an application of the invention to a clutch release bearing designed to release a clutch cover assembly of an automobile vehicle.

Figure 1:
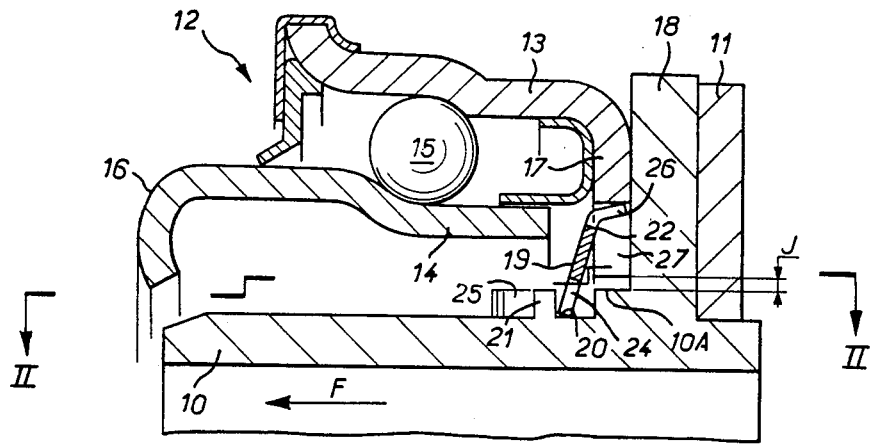
FIG. 1 is a view of an assembled clutch release bearing in radial cross-section on the line I—I in FIG. 2.

The clutch release bearing comprises (FIGS. 1 and 2) an operating sleeve 10 in this instance of a molded, specifically synthetic, material displaceable substantially axially in the direction of the arrow F in FIG. 1 when acted on by a clutch release control means consisting, in general, of a clutch release yoke, cooperating with an anti-wear bearing plate 11.

The clutch release bearing also comprises a bearing 12 surrounding the operating sleeve 10 with a radial clearance J in a manner to be described hereinafter. This bearing 12 comprises an outside non-turning race 13 and an inside turning race 14, between which are disposed rolling members, balls 15, for example. In this embodiment the races are formed from sheet metal without machining away material.

A clutch cover operating boss 16 is carried by and integral with the turning race 14 of the bearing 12.

The non-turning race 13 of the bearing 12 and the operating sleeve 10 feature respective rims 17 and 18. These rims are adjacent one another and perpendicular to the axis. It will be understood that a member may be inserted axially between the two rims, a metal member, for example.

An elastic clamping ring 19 bears at 20 against radially protecting bearing means 21 on the operating sleeve 10 and acts axially at 22 on the rim 17 of the non-turning race 13 of the bearing 12 so as to urge said rim 17 axially in the direction towards the rim 18 of the operating sleeve.

By virtue of this elastic clamping ring 19, the rim 17 is maintained axially in contact with the rim 18 of the operating sleeve 10, directly in this instance, and is adapted to be moved with friction against it. As an alternative, when a number is provided between the rim 17 and the rim 18, said rim 17 is maintained indirectly in contact with the rim 18, the friction being dependent on said member.

With the arrangement described, the bearing 12 and the operating sleeve 10 are assembled together to constitute the clutch release bearing and, in combination with the radial clearance J between the edge of the rim 17 and the part 10A of the sleeve 10 facing it, the clutch release bearing is rendered self-centering relative to the clutch cover assembly, with maintained self-centering action.

As is seen in FIGS. 1 through 5, the bearing means 21 of the operating sleeve against which the elastic clamping ring 19 bears are consituted by annular radial projecting means 21 locally interrupted by passage means 23.

The elastic clamping ring 19 comprises radial lugs 24 oriented towards the axis. These radial lugs 24 are adapted to pass through the passage means 23 and, as the result of a rotary movement engendering a double effect of axial compression and angular displacement of the elastic clamping ring 19, come into bearing engagement against the annular projecting means 21.

Figure 2:
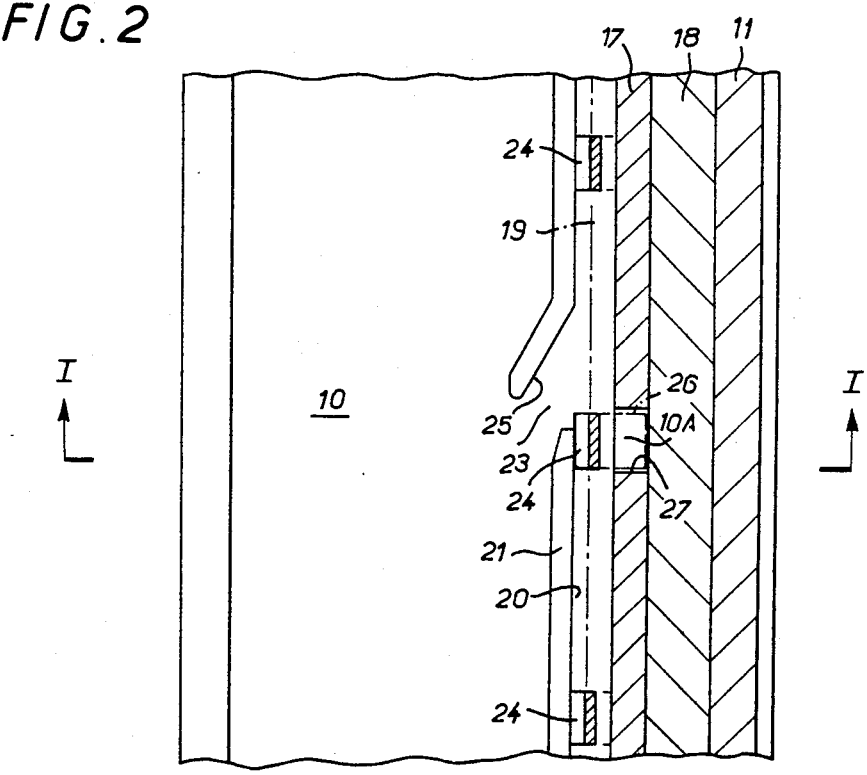
FIG. 2 is a corresponding view of this clutch release bearing in circumferential cross-section on the line II—II in FIG. 1.
Figure 3:
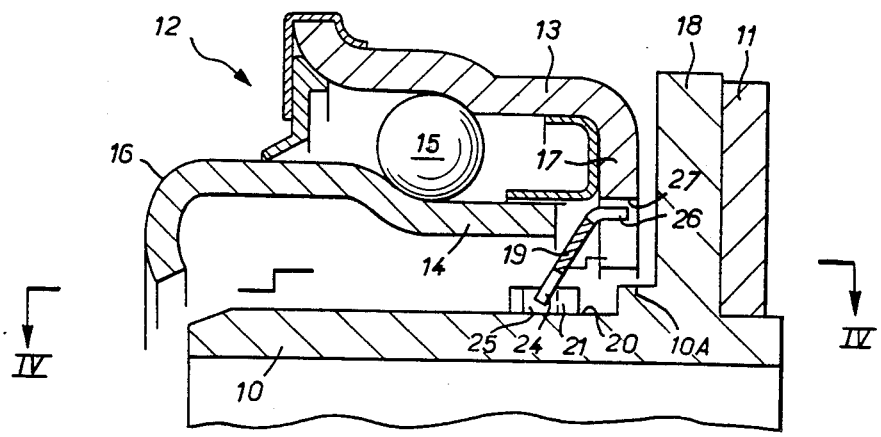
FIG. 3 is a view analogous to FIG. 1 but showing the clutch release bearing during assembly, in radial cross-section on the line III—III in FIG. 4.
Figure 4:
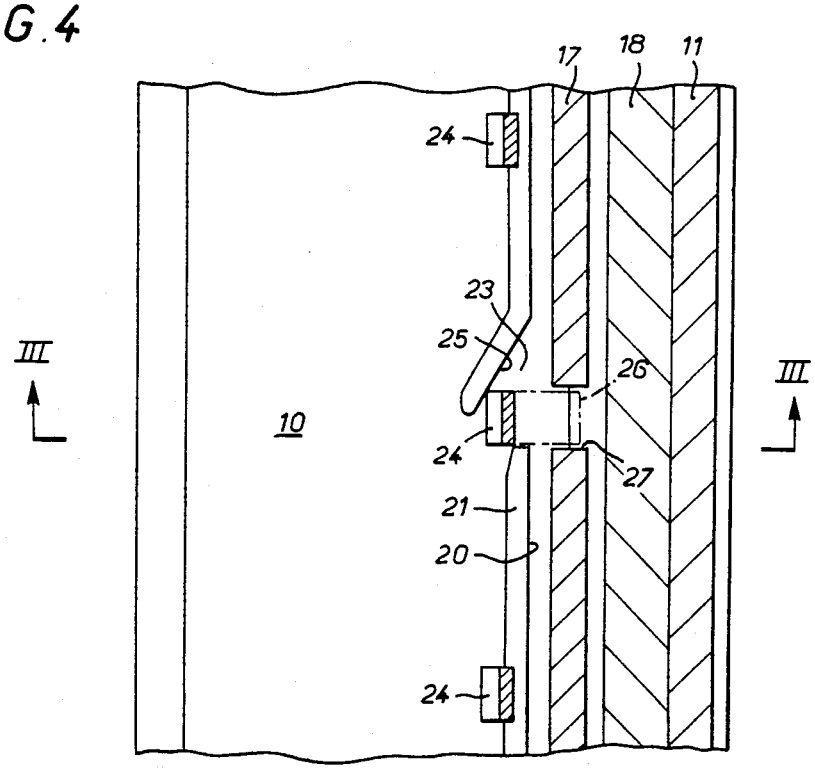
FIG. 4 is a corresponding view in circumferential cross-section on the line IV—IV in FIG. 3.

As is seen more particularly in FIG. 2, the passage means 23 feature a ramp surface 25 to facilitate the engagement of the radial lugs 24 of the elastic clamping ring 19 against the annular radial projecting means 21.

In the example shown in FIGS. 1 through 5, the projecting means 21 consist in an annular rib 21 and the passage means comprise at least one passge 23 through which the radial lugs 24 of the elastic clamping ring 19 are adapted to be inserted in succession. In practice, in this instance two diametrically opposite passages are provided to reduce the rotary movement and in order that the ring remains centered.

Figure 5:
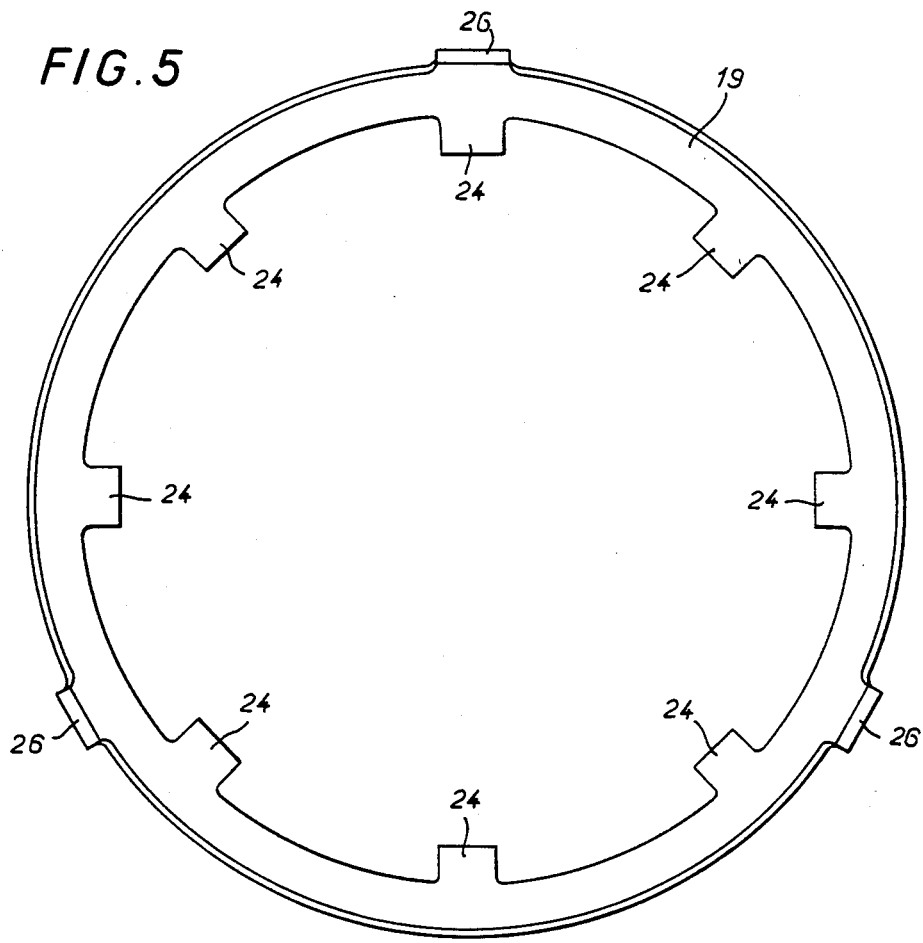
FIG. 5 is a view in elevation of the elastic clamping ring.

In the example of FIGS. 1 through 5, the elastic clamping ring is a Belleville spring 19 and is circumferentially fastened to the non-turning race 13 of the bearing 12 by virtue of tenons 26 of the elastic clamping ring 19 engaged in mortices 27 in the rim 17 of the non-turning race 13 of the bearing 12. As seen in FIGS. 1 and 5, the tenons 26 are disposed at the outside periphery of the ring 19. This ring 19 may therefore be rotated to engage it against the annular rib 21, as a result of rotation of the non-turning race 13 of the bearing 12 relative to the operating sleeve 10.

The very simple and rugged construction of the various constituent parts of the clutch release bearing will be appreciated.

This clutch release bearing is assembled in a very simple way. To this end (FIGS. 3 and 4) the bearing 12 is engaged on the sleeve 10, bringing the rim 17 and the rim 18 together until the lugs 24 are in contact with the rib 21; then, by virtue of the ramp surface 25, the lugs 24 are successively passed through the passage 23 to come into bearing engagement against the rib 21. To achieve this it is sufficient to rotate the outside race 13 of the bearing 12 relative to the sleeve 10, the effect of which is to rotate the ring 19 by virtue of the tenons 26 and mortices 27, whereas the ramp surface 25 compresses the ring 19 axially. During this phase, the lugs are permitted to twist and follow the profile of the ramp surface.

When all the lugs 24 have come into engagement against the rib 21, assembly is complete.

This assembly is extremely rugged and lends itself to maintained self-centering of the clutch release bearing under excellent conditions. It will be seen in FIG. 2 that the lugs 24 are held locked in position behind the rib 21.

An alternative embodiment (FIG. 6) is analogous to that which has just been described with reference to FIGS. 1 through 5, but whereas in FIGS. 1 through 5 the tenons 26 are disposed along the outside periphery of the ring 19, in FIG. 6 the tenons, designated 26' and as before engaged in the mortices 27, are provided at the inside periphery of the ring 19'.

Figure 6:
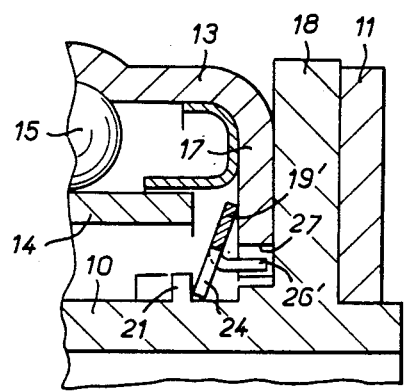
FIG. 6 is a partial view analogous to FIG. 1, but in which the means for circumferentially fastening the non-turning race of the bearing to the operating sleeve are modified.
Figure 7:
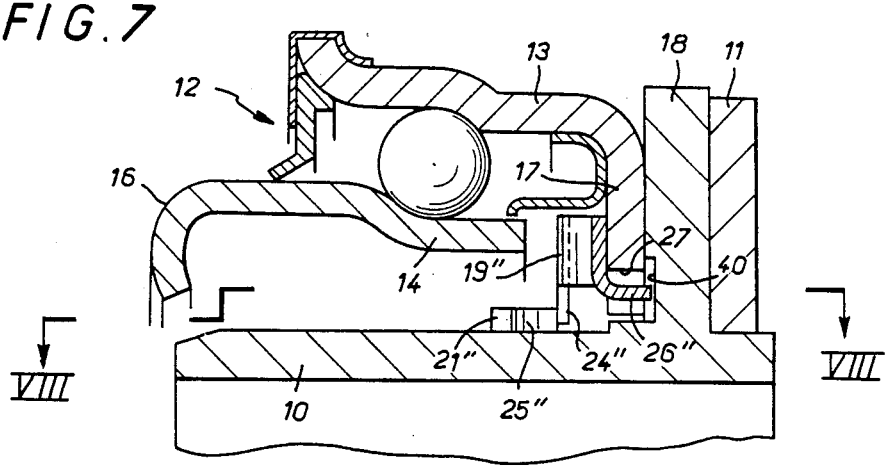
FIG. 7 is a view analogous to FIG. 1 but in which the elastic clamping ring is a corrugated washer rather than a Belleville spring, the clutch release bearing being assembled and shown in radial cross-section on the line VII—VII in FIG. 8.

It will be seen that in FIGS. 1 through 5, as in FIG. 6, the radial lugs 24 are themselves on the same side as the inside periphery of the ring 19.

In another alternative embodiment (FIGS. 7 through 10), the arrangement is still analogous to that which has been described with reference to FIGS. 1 through 6, but the elastic clamping ring, designated 19", is a corrugated washer. Also, the projecting means comprise an annular row of spaced studs 21". These studs 21" still feature ramp surfaces to facilitate engagement, here designated 25". The passage means 23 comprise a plurality of passages 23" which are formed between the studs 21" and through which the radial lugs 24 of the ring 19" are adapted to be inserted simultaneously.

Figure 8:
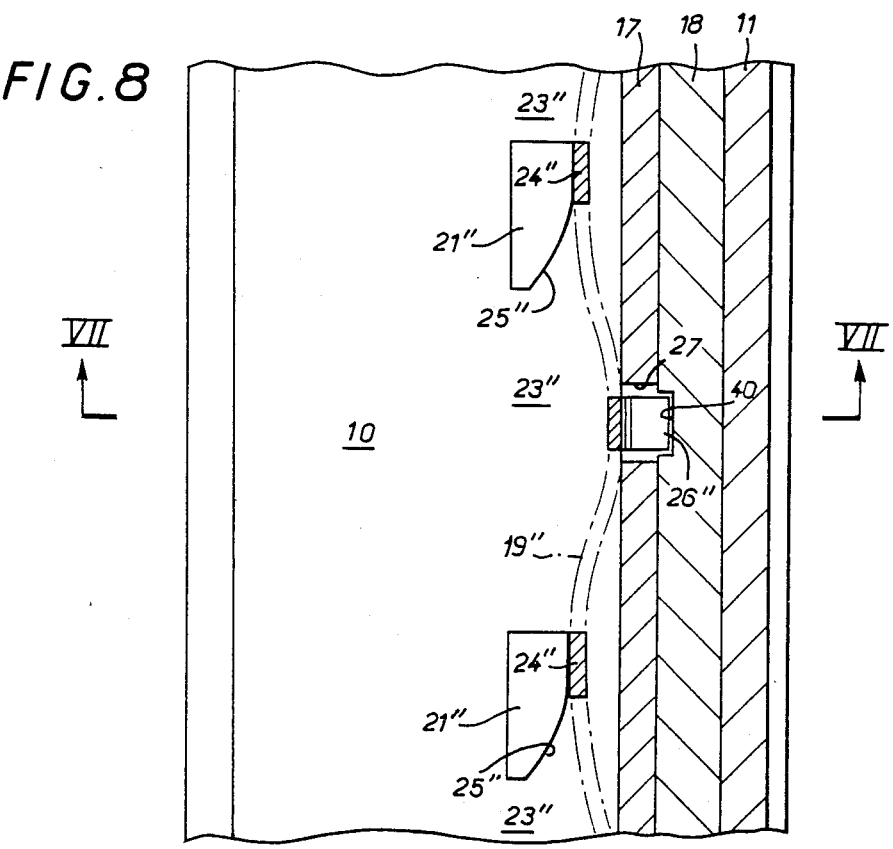
FIG. 8 is a corresponding view in circumferential cross-section on the line VIII—VII in FIG. 7.
Figure 9:
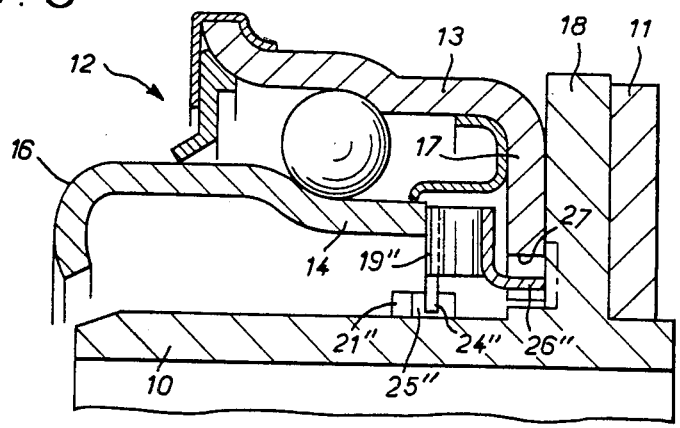
FIG. 9 is a view analogous to FIG. 7 but showing the clutch release bearing during assembly.
Figure 10:
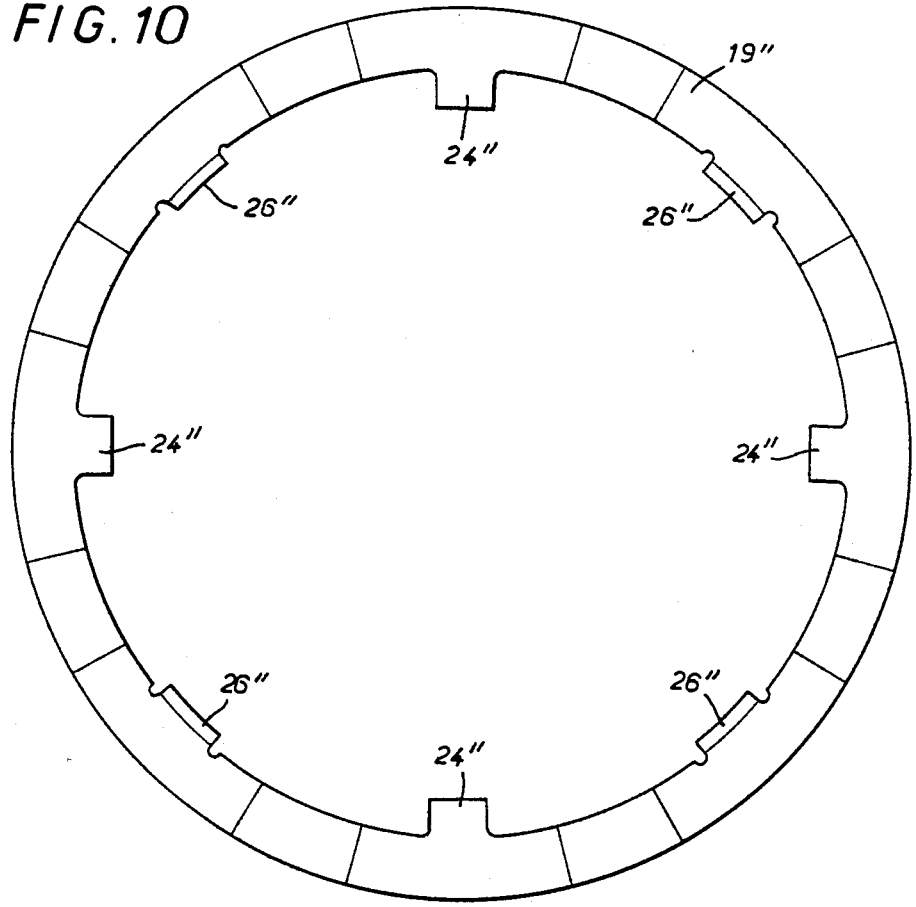
FIG. 10 is a view in elevation of the corrugated elastic clamping ring of the clutch release bearing of FIGS. 7 through 9.
Figure 11:
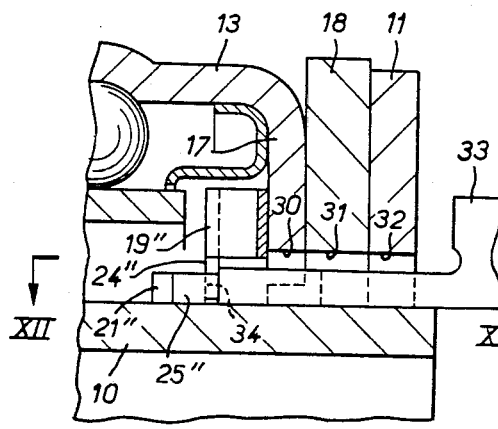
FIG. 11 is a partial view analogous to FIG. 2 but in which rotation of the elastic clamping ring for assembly purposes is achieved, not through the intermediary of the non-turning race of the bearing, but rather by means of a tool, the clutch release bearing being shown in the assembled position and in radial cross-section on the line XI—XI in FIG. 12.

Assembly is effected under similar conditions to those which have been described with reference to FIGS. 1 through 5. The tenons 26" are interlocked with a notch 40 formed in the rim 18 (FIG. 8).

In a further embodiment (FIGS. 11 through 14), the arrangement is analogous to that which has just been described with reference to FIGS. 7 through 10. However, the rims 17 and 18 of the non-turning race 13 of the bearing 12 and the operating sleeve 10 and likewise the bearing plate 11 comprise respective openings 30, 31 and 32 to permit the insertion of a tool 33 adapted to rotate the elastic clamping ring 19 in order to engage it against the annular projecting means 21".

Figure 13:
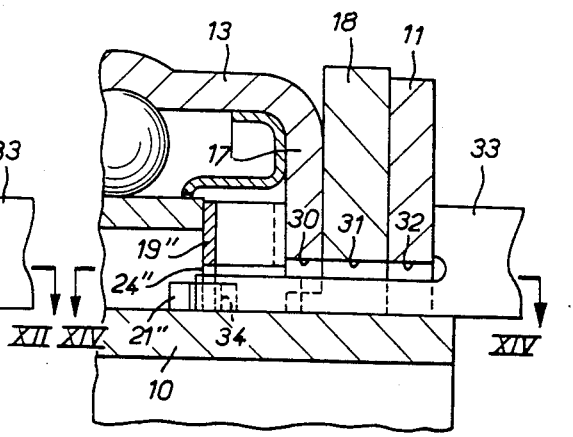
FIG. 13 is a view analogous to FIG. 11 but showing the clutch release bearing during assembly and in radial cross-section on the line XIII—XIII in FIG. 12.
Figure 12:
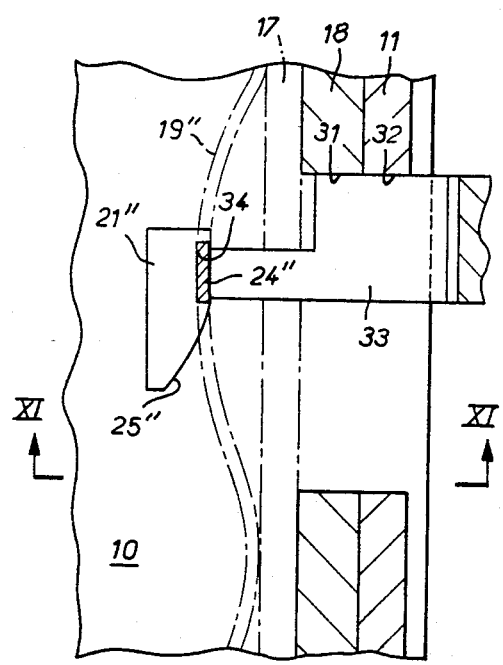
FIG. 12 is a corresponding view in circumferential cross-section on the line XII—XII in FIG. 13.
Figure 14:
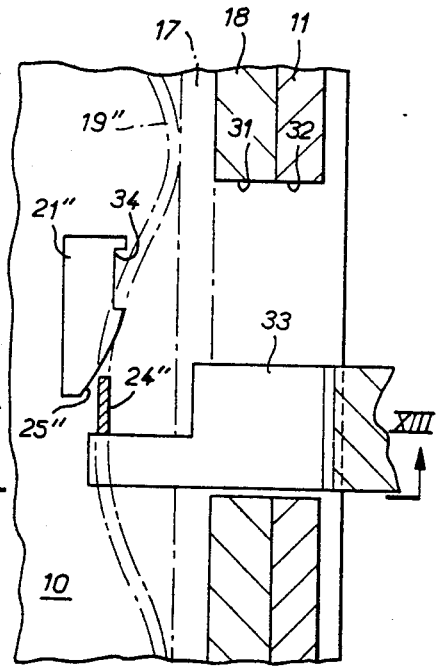
FIG. 14 is a corresponding view im circumferential cross-section on the line XIV—XIV in FIG. 13.

FIGS. 13 and 14 show how the tool 33 is inserted in order to bring the elastic clamping ring 19" into bearing engagement against the studs 21".

In the example of FIGS. 11 through 14, the radial lugs 24 of the elastic clamping ring 19" are adapted to be engaged in an interlocked manner at 34 against the annular projecting means 21". These interlocking means comprise, for example, a notch 34 which is formed in the stud 21" and in which the radial lug 24 of the ring 19" is adapted to be engaged.

It will be appreciated that the process of assembling the elastic ring does not impose excessive forces on the various parts of the clutch release bearing, the assembly forces being limited. Also, the disposition of the bearing means so as to project radially means that the sleeve 10 may be made with the minimum thickness compatible with its function in service. Finally, as is readily seen in the appended drawings, the internal volume of the clutch release bearing is opened up, which provides for easy accommodation of the annular projecting means.

It will be understood that various changes in the details, materials and arrangements of parts which have been herein described and illustrated in order to explain the nature of the invention may be made by those skilled in the art within the principle and scope of the invention as expressed in the appended claims.

For example, the tool 33 may feature a number of branches or a thicker branch benefitting from the radial clearance of the self-centering clutch release bearing, profiting from a maximum gap at one location on the bearing 12. The rim 18 may be provided with a peripheral skirt on which the ring 21 bears. In this case it is the outside race which is the turning one, whereas the non-turning inside race is provided with the rim 17.

There is claimed:

1. Clutch release bearing assembly comprising an operating sleeve adapted to be moved axially by associated clutch release control means, a bearing comprising a non-turning race, a turning race and rolling members between said non-turning and turning races, there being radial clearance between said non-turning race and said sleeve, a clutch cover assembly operating boss fixed relative to said turning race of said bearing, respective and adjacently disposed rims on said non-turning race and said operating sleeve perpendicular to the axial direction, bearing means on said operating sleeve, and an elastic clamping ring bearing against said bearing means and acting axially on said rim of said non-turning race of said bearing so as to urge said rim of said non-turning race axially towards said rim of said operating sleeve so as to clamp said rims axially together, with friction, for assembling together said bearing and said operating sleeve and sustained self-centering of said clutch release bearing relative to said clutch cover assembly, wherein said bearing means on said operating sleeve comprise part annular radial projecting means locally interrupted by at least one passage means featuring an engagement ramp surface extending circumferentially between said passage means and part annular radial projecting means and axially from said passage means toward said rim on said operating sleeve, and said elastic clamping means comprising radial lugs adapted to pass through said at least one passage means and ride along said engagement ramp surface in response to rotation of said elastic clamping ring until said lugs reach said part annular radial projecting means and the elastic clamping ring is suitably compressed.

2. Clutch release bearing assembly according to claim 1, wherein said projecting means comprise an annular rib and said passage means comprise at least one passage therethrough, said radial lugs of said elastic clamping ring being adapted to be passed in succession through said passage.

3. Clutch release bearing assembly according to claim 1, wherein said projecting means comprise an annular row of spaced studs and said passage means comprise a plurality of passages formed between adjacent ones of said studs, said radial lugs of said elastic clamping ring being adapted to be passed simultaneously through respective ones of said plurality of passages.

4. Clutch release bearing assembly according to claim 1, wherein said elastic clamping ring is a Belleville spring.

5. Clutch release bearing assembly according to claim 1, wherein said elastic clamping ring is a corrugated washer.

6. Clutch release bearing assembly according to claim 1, wherein said elastic clamping ring is adapted to be coupled for rotation with said non-turning race of said bearing for the displacement of the radial lugs along said engagement ramp surface to the part annular radial projecting means.

7. Clutch release bearing assembly according to claim 6, wherein said elastic clamping ring is adapted to be coupled for rotation to said non-turning race of said bearing by projecting portions on one of said elastic clamping ring and said rim of said non-turning race of said bearing and receiving portions on another one of said elastic clamping ring and said rim.

8. Clutch release bearing assembly according to claim 1, wherein said rims of said operating sleeve and said non-turning race of said bearing have openings adapted to permit the insertion of a tool adapted to rotate said elastic clamping ring to displace it along said engagement ramp surface to said annular projecting means.

9. Clutch release bearing assembly according to claim 1, wherein said rim of said operating sleeve comprises notches and said elastic clamping ring comprises projecting portions adapted to be locked into said notches.

10. Clutch release bearing assembly according to claim 1, wherein means are provided on said annular projecting means for locking said radial lugs of said elastic clamping ring against rotation.

11. A clutch release bearing assembly having an axis and comprising an operating sleeve adapted to be axially displaced in response to a clutch release control means, an antifriction bearing having a rotating race cooperable with a clutch cover assembly, a nonrotating race, and antifriction means between said races, radial clearance between said nonrotating race and said sleeve, said nonrotating race and said sleeve having respective rims extending transversely relative to the axis of the clutch release bearing assembly, bearing means provided on said operating sleeve, an elastic clamping ring bearing against said bearing means for biasing said rim on said nonrotating race toward said rim on said operating sleeve and providing friction gripping for sustained self-centering of the clutch release bearing relative to a clutch cover assembly, said bearing means comprising circumferentially spaced part annular radial projecting means and passage means therethrough, an inclined surface extending circumferentially between said passage means and said part annular projecting means and axially toward said rim on said operating sleeve, said elastic clamping means having transverse lugs adapted to be inserted through said passage means and ride along said inclined surface for guiding said transverse lugs to said part annular projecting means.

12. Clutch release bearing assembly according to claim 11, wherein there are a plurality of said transverse lugs adapted to be passed in succession through a passage defined by said passage means.

13. Clutch release bearing assembly according to claim 11, wherein there are a plurality of said transverse lugs adapted to be passed through a corresponding plurality of passages defined by said passage means.

14. Clutch release bearing assembly according to claim 11, further comprising means for coupling said elastic clamping means for rotation with said nonrotating race for displacement of said transverse lugs along said inclined surface to an operative position of said elastic clamping means.

15. Clutch release bearing assembly according to claim 14, wherein said means for coupling said elastic clamping means to said nonrotating race of said bearing comprises a projecting portion on one of said elastic clamping means and said nonrotating bearing and a receiving portion on another one of said elastic clamping means and said nonrotating race of said bearing.

16. Clutch release bearing assembly according to claim 11, wherein said rims of said operating sleeve and said nonrotating race of said bearing have openings adapted to be in registration to permit the insertion of a tool for rotating said elastic clamping means to displace it along said inclined surface to said part annular projecting means.

17. Clutch release bearing assembly according to claim 11, wherein said rim of said operating sleeve comprises notches and said elastic clamping means comprises projecting portions adapted to be locked into said notches.

18. Clutch release bearing assembly according to claim 11, wherein means are provided on said projecting means for locking said transverse lugs of said elastic clamping means against rotation.

19. A method of assembling a clutch release bearing assembly comprising an operating member adapted to be displaced axially in response to a clutch release control means, an antifriction bearing having a rotating race adapted to cooperate with a clutch release device, a nonrotating race, and antifriction means between the races, the nonrotating race and the operating sleeve having transverse rims and an elastic clamping means bearing on bearing means on the operating sleeve for biasing the rim on the nonrotating race toward the rim on the operating sleeve for friction gripping action, said method of assembling the bearing on the operating member comprising the steps of inserting a transverse lug on the elastic clamping means through a passage means between part annular radial projecting means of the bearing means, and turning the elastic clamping means relative to the operating sleeve so that the lug is guided along an inclined surface extending circumferentially between the passage means and adjacent part annular radial projecting means and axially toward the rim on the operating sleeve against the bias of the elastic clamping means.

20. A method according to claim 19 including coupling the elastic clamping means for rotation with the nonrotating race and turning the nonrotating race to rotate the elastic clamping measn to its operative position.

21. A method according to claim 19, said turning step includes inserting a tool through openings in the rims engaging the transverse lug of the elastic clamping means and rotating the elastic clamping means to its operative position by angularly displacing the operating tool relative to the axis of the clutch release bearing assembly.

* * * * *